US008994329B2

(12) United States Patent
Ohkuma et al.

(10) Patent No.: US 8,994,329 B2
(45) Date of Patent: *Mar. 31, 2015

(54) STATIONARY CHARGING SYSTEM (71) Applicant: Nichicon Corporation, Kyoto (JP)

(72) Inventors: Shigeo Ohkuma, Kyoto (JP); Takamasa Mitsuya, Kyoto (JP); Shinsuke Tachizaki, Kyoto (JP)

(73) Assignee: Nichicon Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/825,897

(22) PCT Filed: Oct. 1, 2012

(86) PCT No.: PCT/JP2012/075370
§ 371 (c)(1),
(2) Date: Mar. 25, 2013

(87) PCT Pub. No.: WO2013/051502
PCT Pub. Date: Apr. 11, 2013

(65) Prior Publication Data
US 2014/0292271 A1    Oct. 2, 2014

(30) Foreign Application Priority Data

Oct. 5, 2011  (JP) ................. 2011-221039

(51) Int. Cl.
*H02J 7/00* (2006.01)
*B60L 11/18* (2006.01)
*H01M 10/44* (2006.01)
*H02J 13/00* (2006.01)
*H04L 12/40* (2006.01)

(52) U.S. Cl.
CPC ........... *B60L 11/1824* (2013.01); *H01M 10/44* (2013.01); *B60L 11/1838* (2013.01); *H02J 7/0018* (2013.01); *H02J 13/0003* (2013.01); *H04L 2012/40215* (2013.01);
(Continued)

(58) Field of Classification Search
CPC ...................................... Y02T 90/163
USPC .......................................... 320/109
See application file for complete search history.

(56) References Cited

U.S. PATENT DOCUMENTS 6,847,189 B2 * 1/2005 Frank ............................. 320/104
7,688,074 B2 * 3/2010 Cox et al. ...................... 324/426

(Continued)

FOREIGN PATENT DOCUMENTS

CN   201 587 377    9/2010
CN   101 976 867    2/2011

(Continued)

*Primary Examiner* — Yalkew Fantu
(74) *Attorney, Agent, or Firm* — Jordan and Hamburg LLP (57) ABSTRACT A stationary charging system for charging a battery mounted in a vehicle using direct-current charging power includes a power unit for generating direct-current charging power, a plurality of charging units (CHG1 to CHG9) that constitute the power unit, a control unit (MCU), and a first CAN communication line for allowing data exchange between the control unit and the charging units, each of the charging units receives control command data transmitted by the control unit, and creates charging unit status data, and the control unit, and creates charging unit status data, and the control unit divides the charging units into charging unit groups 4-1, 4-2, and 4-3, and transmits the control command data at varying times, whereby the charging unit status data is received at varying times.

5 Claims, 5 Drawing Sheets

(52) U.S. Cl.
CPC ......... *Y02T 10/7088* (2013.01); *Y02T 10/7005* (2013.01); *Y02T 90/16* (2013.01); *Y02T 90/163* (2013.01); *Y02T 90/14* (2013.01); *Y02T 90/128* (2013.01)
USPC ........ 320/109; 320/104; 180/65.1; 180/65.21

(56) References Cited

U.S. PATENT DOCUMENTS

2004/0060751 A1* 4/2004 Frank ........................... 180/65.2
2004/0169489 A1* 9/2004 Hobbs ........................... 320/104
2005/0275374 A1 12/2005 Guang et al.
2011/0234165 A1 9/2011 Palatov

FOREIGN PATENT DOCUMENTS

| CN | 201 781 037 | 3/2011 |
| EP | 2 302 757 | 3/2011 |
| JP | 2008-112413 | 5/2008 |
| JP | 2009-095157 | 4/2009 |
| WO | WO-2011/021718 | 2/2011 |
| WO | WO-2011/062128 | 5/2011 |

* cited by examiner

STATIONARY CHARGING SYSTEM

TECHNICAL FIELD

The present invention relates to stationary charging systems for charging batteries mounted in vehicles, particularly to a stationary charging system including a plurality of charging units.

BACKGROUND OF THE INVENTION

In general, approaches for charging a battery with power supplied from outside a vehicle are roughly classified into the approach that uses an in-vehicle charger mounted in a vehicle, and the approach that uses a stationary charging system located at a charging station or suchlike.

In the former of these approaches, the in-vehicle charger is connected to a household electrical outlet, and performs, for example, 100V AC to 200V DC conversion to charge the battery with a charging power of 200V DC at a relatively low speed.

On the other hand, in the latter approach, the stationary charging system performs, for example, 200V AC to 400V DC conversion to rapidly charge the battery with a charging power of 400V DC.

Figure 5:
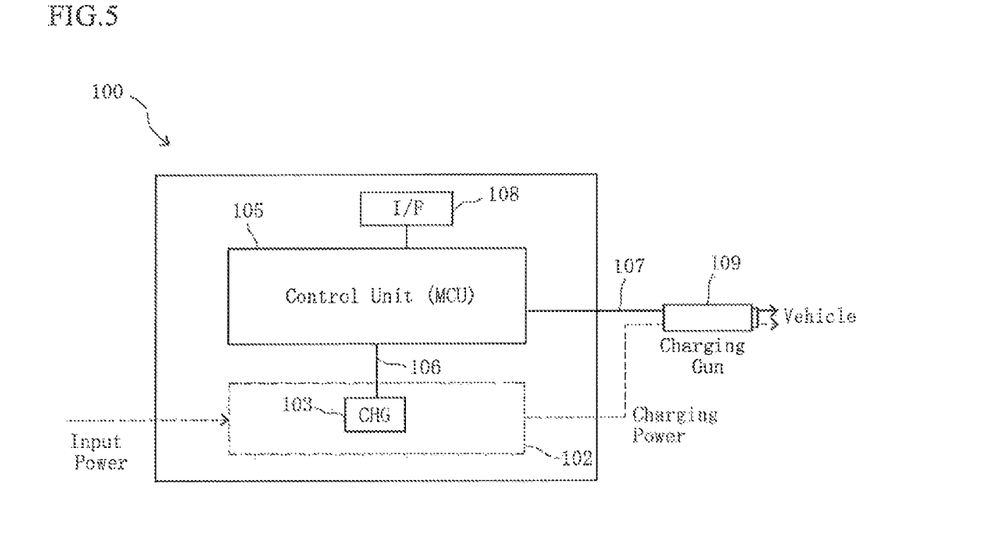
FIG. 5 is a block diagram of a conventional stationary charging system.

For example, a known stationary charging system includes a power unit 102, which consists of a single charging unit (CHG) 103, a control unit (MCU) 105 for controlling the charging unit 103, a first CAN communication line 106 for allowing data exchange between the control unit 105 and the charging unit 103, a second CAN communication line 107 for allowing data exchange between the control unit 105 and a vehicle via a charging gun (connector) 109, and an I/F portion 108, which consists of a liquid crystal touch panel for performing the operation of starting charge, etc., as shown in FIG. 5.

In the stationary charging system 100, the charging unit 103, which constitutes the power unit 102, converts alternating-current input power to direct-current charging power to be supplied to the vehicle via the charging gun 109.

Another known stationary charging system which includes a power unit consisting of a single charging unit is described in Patent Document 1.

Furthermore, in recent years, there is demand for increased output power for shorter charge time, and a known stationary charging system with increased output power has a power unit consisting of a plurality of charging units.

This stationary charging system uses charging power obtained by adding direct-current power outputs from the charging units, thereby realizing increased output power.

PRIOR ART DOCUMENT

Patent Document 1: Japanese Laid-Open Patent Publication No. 2009-95157

SUMMARY OF THE INVENTION

Incidentally, it is generally mandatory that, upon inquiry from a vehicle about the status of its power unit, the stationary charging system transmits data concerning the status of the power unit (power unit status data) to the vehicle within a predetermined period of time as defined by the CHAdeMO standard.

In this regard, in conventional stationary charging systems including a plurality of charging units, each charging unit initially creates charging unit status data concerning its own status (e.g., presence or absence of fault), and thereafter the control unit receives the charging unit status data from the charging unit, creates power unit status data on the basis of the received charging unit status data, and transmits the power unit status data to the vehicle.

However, in such a conventional stationary charging system, the charging unit status data is transmitted to the control unit simultaneously from each charging unit, and therefore, depending on the number of charging units, receiving the charging unit status data from all charging units in a single receiving operation might be beyond the processing capability of the control unit.

When the processing capability of the control unit is exceeded, the control unit might fail in data reception, and in such a case, the control unit attempts again to receive charging unit status data from all of the charging units.

Accordingly, there is a possibility that conventional stationary charging systems might not be able to complete transmission of power unit status data to the vehicle within the predetermined period of rime as defined by the CHAdeMO standard.

Note that by using an expensive control unit with high processing capability, charging unit status data from all charging units can be received in a single receiving operation, but in such a case, there is another problem of cost increase.

The present invention has been made in view of the above circumstances, and a problem thereof is to provide a stationary charging system that allows a control unit to reliably receive data from charging units, without causing cost increase.

To solve the aforementioned problem, the present invention provides a stationary charging system for charging a battery mounted in a vehicle using direct-current charging power generated on the basis of alternating-current input power, the system including a power unit for generating the direct-current charging power on the basis of the alternating-current input power, a plurality of charging units that constitute the power unit, a control unit for controlling the charging units, and a first CAN communication line for allowing data exchange between the control unit and the charging units.

Each of the charging units receives control command data transmitted by the control unit, and creates charging unit status data concerning the status of the charging unit.

The control unit divides the charging units info a plurality of charging unit groups, and sets times at which to transmit the control command data such that transmission to at least one of the charging unit groups occurs at a different time from transmission to the other charging unit groups, whereby the charging unit status data from the charging units is received at varying times.

With this configuration, the control unit receives the charging unit status data at varying times, so that the number of items of charging unit status data to be received by the control unit at one time can be reduced.

Thus, this configuration allows the control unit to reliably receive data from the charging units without using an expensive control unit with high processing capability.

In the stationary charging system, the control unit preferably transmits the control command data to the charging unit groups at varying times for each of the charging unit groups, whereby the charging unit status data from the charging unit groups is received at varying times for each of the charging unit groups.

With this configuration, the control unit can receive the charging unit status data at dispersed times.

Thus, this configuration makes it possible to further reduce the number of items of charging unit status data to be received by the control unit at one time, so that the control unit can more reliably receive data from the charging units.

Furthermore, it is preferable for the stationary charging system to further include a second CAN communication line for allowing data exchange between the control unit and the vehicle.

The control unit determines the gap between times at which to transmit control command data such that the control unit receives the charging unit status data from the charging units, creates power unit status data concerning the status of the power unit on the basis of the charging unit status data, and completes transmission of the power unit status data to the vehicle, within a predetermined period of time after the control unit receives vehicle command data transmitted by the vehicle via the second CAN communication line.

With this configuration, transmission of the power unit status data to the vehicle can be reliably completed within a predetermined period of time as defined by the CHAdeMO standard, for example.

In the stationary charging system, the charging unit status data includes, for example, fault information for the charging units, and the power unit, status data includes, for example, fault information for the power unit created on the basis of the fault information for the charging units.

In the stationary charging system, the alternating-current input power may be three-phase alternating-current power, and each of the charging unit groups may consist of three charging units to which any one of the three phases of the alternating-current power is input.

The present invention makes it possible to provide a stationary charging system that allows a control unit to reliably receive data from charging units, without causing cost increase.

DESCRIPTION OF THE PREFERRED EMBODIMENTS

Hereinafter, a preferred embodiment of a stationary charging system according to the present invention will be described with reference to the accompanying drawings.
[Configuration of Stationary Charging System]

Figure 1:
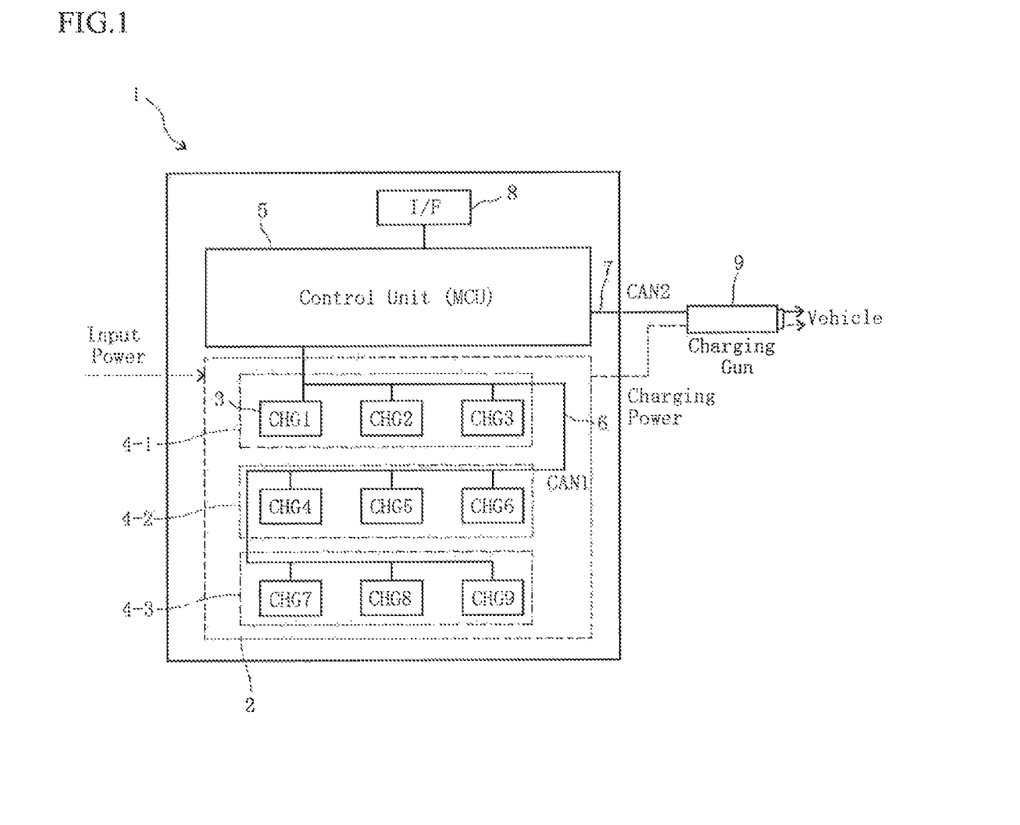
FIG. 1 is a block diagram of a stationary charging system according to the present invention.

FIG. 1 provides a block diagram of a stationary charging system 1 according to an embodiment of the present invention.

As shown in the figure, the stationary charging system 1 includes a power unit 2 consisting of a plurality (in the present embodiment, nine) of charging units 3 (CHG1 to CHG9, a control unit (MCU) 3 for controlling the charging units 3, a first CAN communication line 6 for allowing data exchange between the control unit 5 and the charging units 3, a second CAN communication line 7 for allowing data exchange between the control unit 5 and a vehicle via a charging gun (connector) 9, and an I/F portion 8 consisting of a liquid-crystal touch panel for performing the operation of starting charge, etc.

The charging units 3 are connected in parallel to the first CAN communication line 6, and divided by the control unit 5 into groups of three: first charging unit group 4-1 (CHG1 to CHG3); second charging unit group 4-2 (CHG4 to CHG6); and third charging unit group 4-3 (CHG7 to CHG9).

Input power supplied to the power unit 2 is three-phase alternating-current power, and any one of the three phases is inputted to the three charging units 3 included in each of the charging unit groups 4-1, 4-2, and 4-3. For example, phases U, V, and W are inputted to 4-1, 4-2, and 4-3, respectively.

Figure 2:
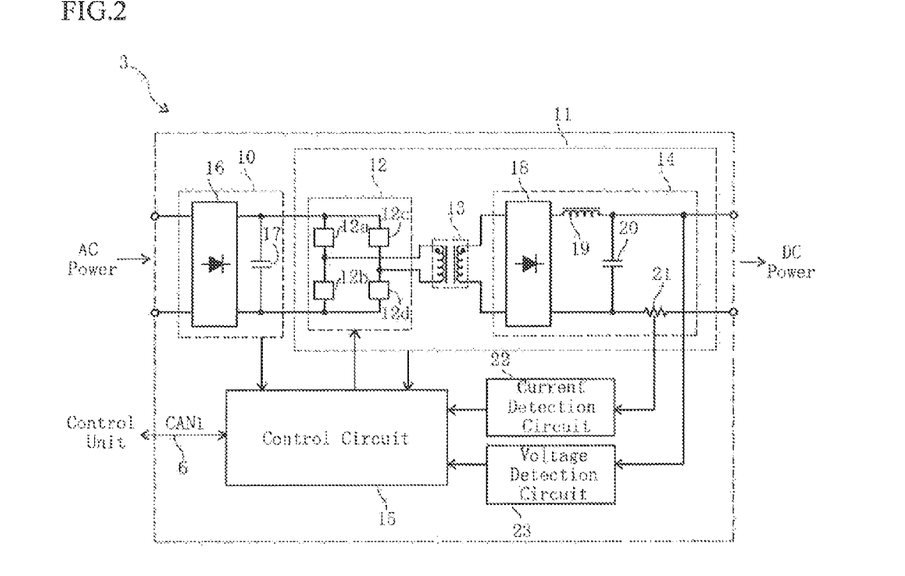
FIG. 2 is a block diagram of a charging unit of the present invention.

FIG. 2 provides a block diagram of the charging unit 3.

As shown in the figure, the charging unit 3 includes a rectifying and smoothing circuit 10 for rectifying and smoothing one of the phases of alternating-current power, thereby generating direct-current, power, a DC/DC converter circuit 11 for converting the direct-current power generated by the rectifying and smoothing circuit 10 to direct-current power to be used as charging power, through switching with switching means 12a to 12d, and a control circuit 15 for exchanging data with the control unit 5 via the first CAN communication line 6 and controlling duty cycles of the switching means 12a to 12d.

The rectifying and smoothing circuit 10 includes a diode bridge circuit 16, a smoothing capacitor 17, and an unillustrated power factor improvement circuit.

The DC/DC converter circuit 11 includes an inverter circuit 12, which consists of the four switching means 12a to 12d such as IGBTs or MOSFETs, a boost circuit 13, which is a transformer, and an output circuit 14 connected to the secondary terminal of the transformer.

The output circuit 14 has a diode bridge circuit 18, an LC low-pass filter, which consists or a coil 19 and a smoothing capacitor 20, and a shunt resistance 21 of several m$\Omega$ Furthermore, the charging unit 3 includes a current detection circuit 22 for detecting direct-current electricity applied to the shunt resistance 21, and a voltage detection circuit 23 for detecting direct-current voltage past the LC low-pass filter.

The control circuit 15 exchanges data with the control unit 5 via the first CAN communication line 6.

Specifically, the control circuit 15 has a fault diagnosis function for determining whether or not there is any fault in the rectifying and smoothing circuit 10 and the DC/DC converter circuit 11, and upon reception of control command data from the control unit 5, the control circuit 15 creates charging unit status data concerning the status of the charging unit 3, and transmits the charging unit status data to the control unit 5 via the first CAN communication line 6.

The charging unit status data includes, for example, identification information (ID) for the charging unit 3, fault information (fault code) for the charging unit 3, and information concerning the current and voltage values defected by the current defection circuit 22 and the voltage detection circuit 23.

Referring again to FIG. 1, the control unit 5 exchanges data with the vehicle via the second CAN communication line 7.

Specifically, upon reception of charging unit status data from the charging units 3, the control unit 5 creates power unit status data, which includes fault information, etc., for the power unit 2, on the basis of fault information, etc., for the charging unit 3 included in the charging unit status data, and transmits the power unit status data to the vehicle via the second CAN communication line 7.

[Operation of Stationary Charging System]

Figure 3:
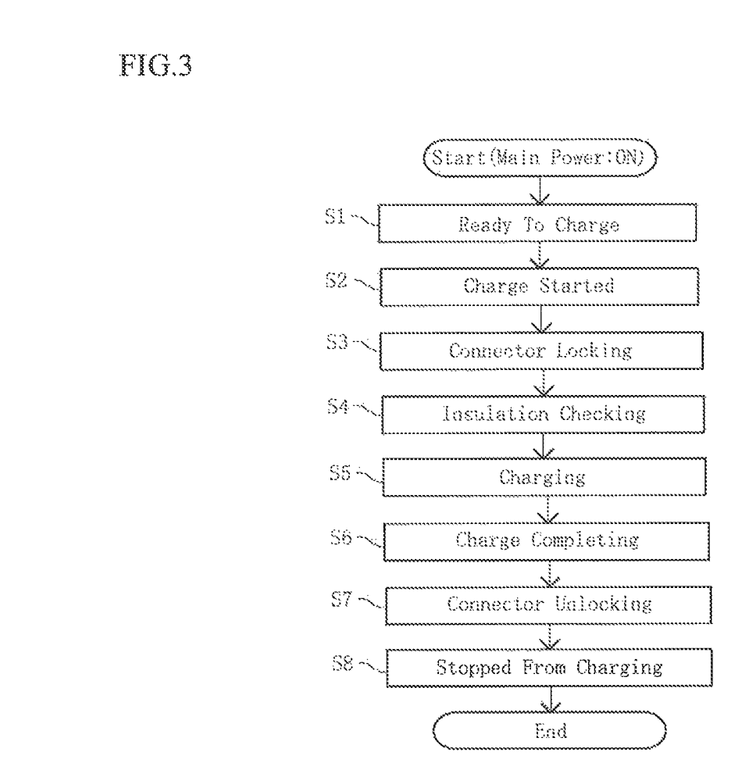
FIG. 3 is a flowchart illustrating a series of operations of the stationary charging system according to the present invention.

Next, a series of operations of the stationary charging system 1 will be described with reference to FIG. 3.

When the main power of the stationary charging system 1 is turned on, the control unit 5 and the charging units 3 are activated, and the control unit 5 divides the charging units 3 into groups. This grouping will be described later.

Upon completion of the grouping, the stationary charging system 1 is brought info a "ready to charge (S1)" state, and when a charge start button displayed on the I/F portion 8 is pressed during the "ready to charge (S1)" state, the stationary charging system 1 is brought into a "charge started (S2)" state.

In the "charge started (S2)" state, data exchange between the control unit 5 and the vehicle via the second CAN communication line 7 starts.

Specifically, the control unit 5 receives battery status data transmitted from the vehicle, which includes data about battery capacity, etc., and the control unit 5 transmits power unit status data, which includes fault information for the power unit 2, etc., after determining compatibility with the vehicle on the basis of the battery status data.

The vehicle receives the power unit status data, and transmits vehicle command data to the control unit 5 in order to allow charge after determining compatibility with the stationary charging system 1 on the basis of the power unit status data.

Once the control unit 5 receives the vehicle command data, the stationary charging system 1 is brought into a "connector locking (S3)" state, so that a connector locking process is performed under control of the control unit 5 to lock the charging gun (connector) 9 to the vehicle.

Upon completion of the connector locking process, the stationary charging system 1 is brought into an "insulation checking (S4)" state, so that an insulation checking process is performed to apply voltage to the charging gun 9 for a short period of time to confirm that there is no snort circuit or suchlike.

Upon completion of the insulation checking process, the stationary charging system 1 is brought into a "charging (S5)" state, so that charge is performed on the basis of vehicle command data concerning target charge current values transmitted from the vehicle.

The vehicle command data concerning target charge current values is transmitted to the control unit 5 every 100 ms via the second CAN communication line 7.

Upon reception of the vehicle command data, the control unit 5 creates control command data concerning values of current to be outputted by the charging units 3, on the basis of the vehicle command value data, and transmits the control command data to the charging units 3 via the first CAN communication line 6, thereby controlling the output current of the charging units 3.

In the "charging (S5)" state, once a charge stop button displayed on the I/F portion 8 is pressed or a charge time specified by the vehicle reaches zero, the stationary charging system 1 is brought into a "charge completing (S6)" state, so that a charge completing process is performed before the stationary charging system 1 is brought into a "connector unlocking (S7)" state.

In the "connector unlocking (S7)" state, a connector, unlocking process is performed under control of the control unit 5 to release the lock of the charging gun 9, so that the stationary charging system 1 is brought into a "stopped from charging (S8)" state, thereby completing the series of operations.

[Data Communication Between Control Unit and Charging Units]

Next, data communication between the control unit 5 and the charging units 3 will be specifically described.

Note that in this specific example, the nine charging units 3 included in the power unit 2 are assumed to be divided into first charging unit group 4-1 consisting of charging units CHG1 to CHG3, second charging unit group 4-2 consisting of charging units CHG4 to CHG6, and third charging unit group 4-3 consisting of charging units CHG7 to CHG9.

Furthermore, in this specific example, it is assumed that power unit status data created by the control unit 5 has to be transmitted to the vehicle via the second CAN communication line 7 within 200 ms after the main power is turned on.

Figure 4:
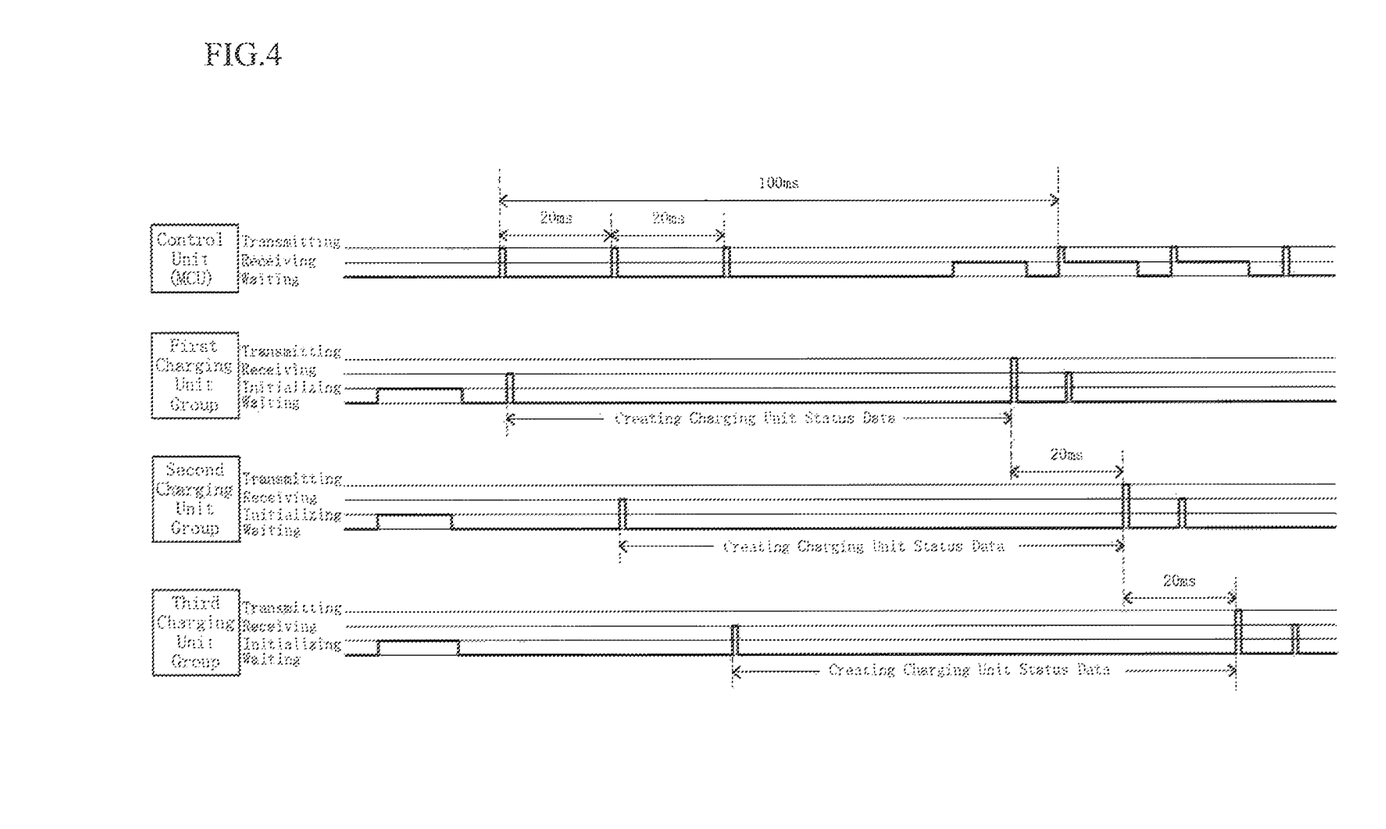
FIG. 4 is a timing chart at the time of activation of the stationary charging system according to the present invention.

FIG. 4 provides a timing chart at the time of activation of the stationary charging system 1 (from the time the main power is turned on until the time of being ready to charge (S1)).

As shown in the figure, initially after the main power of the stationary charging system 1 is turned on, so that the control unit 5 and the charging units 3 start to be activated, the charging units 3 start to be initialized concurrently.

After the initialization of the charging units 3 is complete, the control unit 5 creates control command data, which causes the charging units 3 to transmit charging unit status data, and transmits the control command data to the charging units 3 via the first CAN communication line 6 at varying times among charging unit groups 4-1, 4-2, and 4-3.

Specifically, the control unit 5 transmits the control command data first to the charging units (CHG1 to CHG3) that constitute first charging unit group 4-1, 20 ms later to the charging units (CHG4 to CHG6) that constitute second charging unit group 4-2, and another 20 ms later to the charging units (CHG7 to CHG9) that constitute third charging unit group 4-3.

The gap between times at which to transmit the control command data is set to such a value that allows the control unit 5 to receive charging unit status data from the charging units 3, create power unit status data, and complete transmission of the power unit status data to the vehicle within a predetermined period of time (in this specific example, 200 ms) after the control unit 5 receives vehicle command data transmitted by the vehicle via the second CAN communication line 7.

For example, in the case where the time required for each charging unit 3 to create charging unit status data after reception of control command data is 90 ms, and the time required for the control unit 5 to create power unit statue data after reception of the last charging unit status data (from the last group of charging units (CHG7 to CHG9)) is 70 ms, the gap between times at which to transmit the control command data is (200 ms−90 ms−70 ms)/(3 (the number of charging unit groups)−1)=20 ms, without taking into account the time to be taken to initialize the charging units 3.

Upon reception of the control command data, the charging units 3 create charging unit status data.

The charging unit status data are transmitted to the control unit 5 via the first CAN communication line 6 in order of creation.

Specifically, the control unit 5 receives charging unit status data first from the charging units (CHG1 to CHG3) that constitute first charging unit group 4-1, 20 ms later from the charging units (CHG4 to CHG6) that constitute second charging unit group 4-2, and another 20 ms later from the charging units (CHG7 to CHG9) that constitute third charging unit group 4-3.

Upon reception of the charging unit status data from all of the charging units (CHG1 to CHG9), the control unit 5 creates power unit status data, including fault information for the power unit 2, on the basis of the received charging unit status data, and transmits the created data to the vehicle.

Note that the above specific example has been described with respect to the data communication between the control unit 5 and the charging units 3 at the time of activation of the stationary charging system 1 (from the time the main power is turned on until the time of being ready to charge (S1)), but even in the case where the stationary charging system 1 is in another state, the control unit 5 transmits control command data to charging unit groups 4-1, 4-2, and 4-3 at varying times for each of the charging unit groups.

Consequently, in the stationary charging system 1 according to the present embodiment, the times at which the control unit 5 transmits control command data to charging unit groups 4-1, 4-2, and 4-3 are different, so that the control unit 5 can receive charging unit status data at dispersed times.

Accordingly, in the stationary charging system 1 according to the present embodiment, the number of items of charging unit status data to be received by the control unit 5 at one time can be reduced.

Therefore, the stationary charging system 1 according to the present embodiment can prevent the number of items of charging unit status data to be received at one time from being beyond the processing capability of the control unit 5, so that, the control unit 5 can reliably receive the charging unit status data within a predetermined communication cycle (in the present embodiment, 20 ms) for the first CAN communication line 6.

Furthermore, the stationary charging system 1 according to the present embodiment can prevent power unit status data from not being completely transmitted to the vehicle within a predetermined period of time after the control unit 5 receives vehicle command data because the gap between times at which to transmit control command data is set such that the control unit 5 can create the power unit status data on the basis of charging unit status data and transmit the power unit status data to the vehicle within the predetermined period of time.

While the present invention has been described above with respect to a preferred embodiment of the stationary charging system, the present invention is not limited to the embodiment.

In the above embodiment, the control unit 5 has such processing capability that three items of charging unit status data can be received at a time, and therefore, charging unit status data from charging unit groups 4-1, 4-2, and 4-3 is received at varying times for each of the charging unit groups, but in the case where the control unit 5 has such processing capability that six items of charging unit status data can be received at a time, the time of transmission to two charging unit groups (e.g., 4-1 and 4-2) may be set different from the time of transmission to the other charging unit group (e.g., 4-3).

In this manner, the gap between the times of transmission to the charging unit groups can be optimised in accordance with the processing capability of the control unit, whereby it is possible to increase the number of charging units that can be installed while meeting the requirements for the duration of transmission of power unit status data to the vehicle.

Furthermore, in the embodiment, the power unit 2 consists of mine charging units 3, but the number of charging units 3 can be arbitrarily changed in accordance with required charging power.

Note that in the case where three-phase alternating-current power is used as input power, the number of charging units 3 is preferably a multiple of 3, and each of the charging unit groups (4-$l$ to 4-$n$ (where n is an integer of 2 or more)) preferably consists of three charging units 3.

Furthermore, in the embodiment, the nine charging units 3 that constitute the power unit 2 are divided into first charging unit group 4-1 consisting of charging units CHG1 to CHG3, second charging unit group 4-2 consisting of charging units CHG4 to CHG6, and third charging unit group 4-3 consisting of charging units CHG7 to CHG9, but since the charging units 3 are connected in parallel via the first CAN communication line 6, each charging unit group can be made up of any three charging units 3.

DESCRIPTION OF THE REFERENCE CHARACTERS 1 stationary charging system
2 power unit
3 charging unit
4-1, 4-2, 4-3 charging unit group
5 control unit
6 first CAN communication line
7 second CAN communication line
8 I/F portion
9 charging gun
10 rectifying and smoothing circuit
11 DC/DC converter circuit
12 inverter circuit
12a to 12d switching means
13 boost circuit (transformer)
14 output circuit
15 control circuit
16 diode bridge circuit
17 smoothing capacitor
18 diode bridge circuit
19 coil
20 smoothing capacitor
21 shunt resistance
22 current detection circuit
23 voltage detection circuit

The invention claimed is:

1. A stationary charging system for charging a battery mounted in a vehicle using direct-current charging power generated on the basis of alternating-current input power, the system comprising:
a power unit for generating the direct-current charging power on the basis of the alternating-current input power;
a plurality of charging units that constitute the power unit;
a control unit for controlling the charging units; and
a first CAN communication line for allowing data exchange between the control unit and the charging units, wherein,
each of the charging units receives control command data transmitted by the control unit, and creates charging unit status data concerning the status of the charging unit, and
the control unit divides the charging units into a plurality of charging unit groups, and sets times at which to transmit the control command data such that transmission to at least one of the charging unit groups occurs at a different time from transmission to the other charging unit groups, whereby the charging unit status data from the charging units is received at varying times.

2. The stationary charging system according to claim 1, wherein the control unit transmits the control command data to the charging unit groups at varying times for each of the charging unit groups, whereby the charging unit status data from the charging unit groups is received at varying times for each of the charging unit groups.

3. The stationary charging system according to claim 1, further comprising a second CAN communication line for allowing data exchange between the control unit and the vehicle, wherein, the control unit determines the gap between times at which to transmit control command data such that the control unit receives the charging unit status data from the charging units, creates power unit status data concerning the status of the power unit on the basis of the charging unit status data, and completes transmission of the power unit status data to the vehicle, within a predetermined period of time after the control unit receives vehicle command data transmitted by the vehicle via the second CAN communication line.

4. The stationary charging system according to claim 3, wherein, the charging unit status data includes fault information for the charging units, and the power unit status data includes fault information for the power unit created on the basis of the fault information for the charging units.

5. The stationary charging system according to claim 1, wherein, the alternating-current input power is three-phase alternating-current power, and each of the charging unit groups consists of three charging units to which any one of the three phases of the alternating-current power is input.

\* \* \* \* \*